United States Patent
Paleja

(10) Patent No.: US 9,244,818 B1
(45) Date of Patent: Jan. 26, 2016

(54) AUTOMATED SELECTION OF QUALITY CONTROL TESTS TO RUN ON A SOFTWARE APPLICATION

(75) Inventor: Ameesh Paleja, Irvine, CA (US)

(73) Assignee: Amazon Technologies, Inc., Seattle, WA (US)

(*) Notice: Subject to any disclaimer, the term of this patent is extended or adjusted under 35 U.S.C. 154(b) by 801 days.

(21) Appl. No.: 13/074,723

(22) Filed: Mar. 29, 2011

(51) Int. Cl.
G06F 9/44 (2006.01)
G06F 11/00 (2006.01)
G06F 11/36 (2006.01)
G06F 21/50 (2013.01)

(52) U.S. Cl.
CPC ............ *G06F 11/3672* (2013.01); *G06F 21/50* (2013.01)

(58) Field of Classification Search
None
See application file for complete search history.

(56) References Cited

U.S. PATENT DOCUMENTS

| | | | |
|---|---|---|---|
| 5,960,170 A * | 9/1999 | Chen et al. | 714/38.14 |
| 7,725,941 B1 * | 5/2010 | Pavlyushchik | G06F 21/564 713/187 |
| 8,001,606 B1 * | 8/2011 | Spertus | 726/25 |
| 8,495,705 B1 * | 7/2013 | Verma | G06Q 10/10 711/163 |
| 8,533,844 B2 * | 9/2013 | Mahaffey et al. | 726/25 |
| 2002/0198882 A1 * | 12/2002 | Linden et al. | 707/10 |
| 2005/0091192 A1 * | 4/2005 | Probert et al. | 707/1 |
| 2007/0022324 A1 * | 1/2007 | Chang et al. | 714/38 |
| 2009/0083731 A1 * | 3/2009 | Sobel | 717/177 |
| 2010/0211772 A1 * | 8/2010 | Johansson et al. | 713/156 |
| 2011/0047597 A1 * | 2/2011 | Mahaffey et al. | 726/3 |
| 2011/0167275 A1 * | 7/2011 | Niemela | 713/188 |
| 2014/0033177 A1 * | 1/2014 | Chang et al. | 717/124 |

OTHER PUBLICATIONS

Hassinen, M., et al. "Trustworthy Widget Sharing" Helsinki Institute of Technology [online], 2010 [retrieved Sep. 15, 2015], Retrieved from Internet: <URL: http://futureinternet.fi/publications/trustworthy_widget_sharing_final.pdf>, pp. 1-122.*

* cited by examiner

*Primary Examiner* — Todd Aguilera
(74) *Attorney, Agent, or Firm* — Knobbe, Martens, Olson & Bear, LLP

(57) ABSTRACT

This disclosure describes systems and associated processes that enable an application provider to tailor the testing of an application provided by a developer based on a developer trust level or confidence level. Based, at least in part, on the developer trust level, the application provider can automatically determine tests to run on the application. Advantageously, in certain embodiments, tailoring testing based at least in part on the developer trust level enables the application provider to reduce the amount of resources expended on testing while maintaining customer confidence and satisfaction.

35 Claims, 5 Drawing Sheets

AUTOMATED SELECTION OF QUALITY CONTROL TESTS TO RUN ON A SOFTWARE APPLICATION

BACKGROUND

The process of testing new software applications can be expensive both monetarily and in terms of human resources. As mobile applications (sometimes called "apps") proliferate and become more sophisticated, the costs associated with testing such applications also increases. However, as more applications are created that access sensitive user data, the importance of properly testing applications also increases.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF SPECIFIC EMBODIMENTS

Introduction

Figure 1:
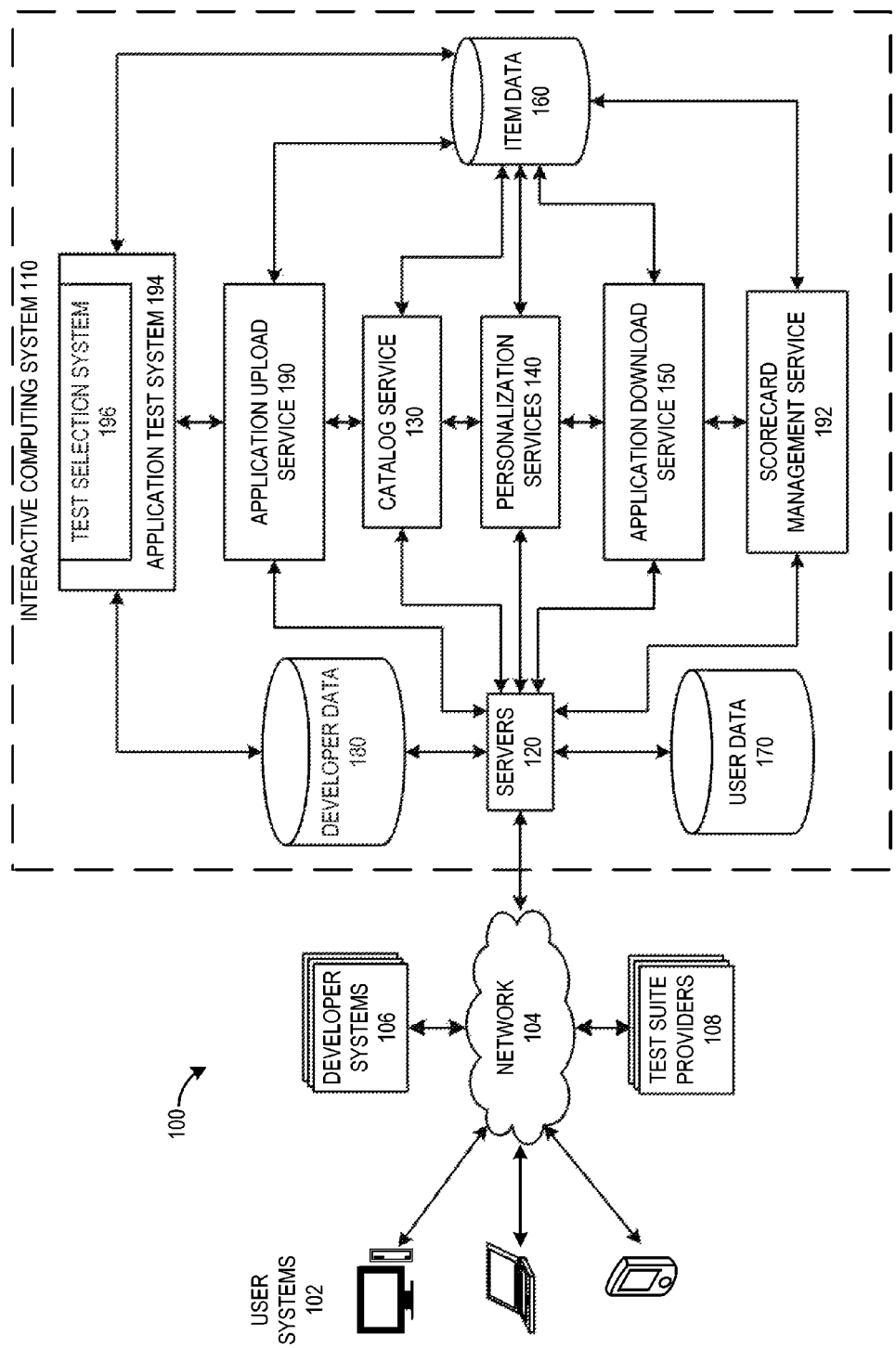
FIG. 1 illustrates an embodiment of a networked computing environment that can implement the features described herein in the context of an example interactive computing system.

A number of application developers may not fully or properly test their applications before releasing them into the marketplace. Some smaller developers may not have the resources or even the knowledge to fully test their applications. For example, a number of popular apps are designed by individuals who develop applications as a hobby, and therefore may not have the time or resources to fully test the applications. In addition, there exist malicious developers who purposely create malicious code that masquerades as a legitimate application.

Although some application developers provide their products directly to users, a number of application developers use third-party services that act as application providers, application publishers, or application distribution services. For example, the applications written by various developers are commonly made available to customers by an application provider that operates an "app store." An application provider can either trust the application developers to create mistake-free non-malicious code or test each application before making it available to users. Trusting the application developers can lead to angry customers or worse, as even well intentioned developers can unintentionally create "buggy" applications. However, testing each application can be expensive for the application provider. This is particularly the case if, for example, the application provider sells many thousands or millions of applications from a wide range of developers, or if the application provider must test several iterations of an application before publishing it to users.

This disclosure describes systems and associated processes that enable an application provider to tailor the testing of an application obtained from a developer based partly or wholly on a developer trust level, confidence level, or any other classification defined by an application provider. In some embodiments, the developer trust level can be associated with a probability or prediction that a particular developer will do one or more of the following: (1) produce mistake-free executable code; (2) produce malicious code; and (3) fully test the application for each applicable computing device and operating system platform before submitting the application to the application provider. The trust level can be associated with one or more of application metadata, past experience with the developer, and public information associated with the developer and/or application. Further, in some embodiments, the developer trust level can be application-specific. For example, the developer trust level for a particular developer can differ for banking applications compared to music applications.

Based, at least in part, on the developer trust level, the application provider can automatically determine or select tests, such as specific "quality control" or compliance tests, to run on the application. Advantageously, in certain embodiments, tailoring testing based at least in part on the developer trust level enables the application provider to reduce the amount of resources expended on testing while maintaining customer confidence and satisfaction. For example, in some embodiments, the application provider can allocate more testing resources to testing applications and application functions that are more likely to include problems or result in negative customer feedback if problematic. Similarly, in some embodiments, the application provider can allocate fewer testing resources to testing applications and application functions that are less likely to include problems or result in negative customer feedback if problematic. These tests may seek to ensure that the application is mistake-free, functions as reported by the developer, and does not include any unreported and potentially undesirable functionality.

The applications referred to herein can be in a variety of forms, including binary code, assembly code, source code, object code, interpreted code, executable code, and scripted code, and can include non-executable data. Further, while parts of the disclosure discuss mobile applications, the teachings of the present disclosure are not limited as such and can be applied to any type of application.

Example Computing Environment Overview

FIG. 1 illustrates an embodiment of a networked computing environment 100 that can implement the features described herein in the context of an example interactive computing system 110. The interactive computing system 110 can provide testing services for applications provided by the developer systems 106 and associated developers. These testing services can include, but are not limited to, tests associated with an application's functionality as reported by the application's developer (e.g. whether an application successfully performs the functions reported), tests associated with an application's unreported functionality (e.g. whether an application does more than reported or accesses more data than reported), tests associated with determining the application's impact on the battery life of one or more computing devices, tests associated with the amount of network resources used by the application, and tests associated with the application's ability to run on specific devices or with specific operating systems. Further, the interactive computing system 110 can determine the number and type of tests to perform on an application submitted by a developer based on information associated with the developer and/or the application. This information can include information provided by the developer, information provided by third-party sources, information associated with the application, such as metadata, and information derived and/or mined from these aforementioned sources of information.

In some embodiments, the interactive computing system 110 acts as an application provider system associated with an application provider and can provide applications for access by user systems 102 and associated users. The interactive computing system 110 provides application distribution features that provide access to applications for the user systems 102. Further, the interactive computing system 110 can provide an electronic catalog and associated services for browsing, searching, and otherwise exploring the electronic catalog. In some embodiments, the interactive computing system 110 can act as a testing service for application developers, whether or not the application developers choose to publish their applications with the interactive computing system 110.

The user systems 102 and the developer systems 106 can communicate with the interactive computing system 110 over a network 104. The network 104 may include any system for allowing multiple computing devices to communicate with each other. For example, the network 104 can be a LAN, a WAN, the Internet, combinations of the same, or the like. Further, the network 104 can be wired, wireless, or a combination of the same.

In general, a developer system 106 can provide any type of application, in whole or in part, to the interactive computing system 110. The application can be, for example, a new application, a new version of an application, a patch to an application, an update to an application, new content associated with an application, such as an expansion pack or add-on for the application, a demonstration version of an application, or any other type of application, in whole or in part. Further, the types of applications that the user systems 102 and the developer systems 106 are capable of executing do not limit the application that the developer systems 106 can provide to the interactive computing system 110. Moreover, the developer systems 106 can, but need not be, operated by entities who are different from one another and who are different from an operator of the interactive computing system 110.

The interactive computing system 110 can be implemented with one or more physical servers or computing machines. Thus, each of the components depicted in the interactive computing system 110 can include hardware and/or software for performing various features. In one embodiment, the interactive computing system 110 is a web site or collection of web sites.

In the depicted embodiment, the interactive computing system 110 includes several components that can be implemented in hardware and/or software. For instance, the interactive computing system 110 includes one or more physical servers 120 for sending, receiving, and responding to network requests from the user systems 102 and the developer systems 106. Further, the servers 120 can send, receive, and respond to network requests from the test suite providers 108. The one or more servers 120 can include web servers, application servers, database servers, combinations of the same, or the like. The interactive computing system 110 also includes a catalog service 130 and associated search engine (not shown) in communication with the one or more servers 120. Users can browse an electronic catalog provided by the catalog service 130 or query the search engine to obtain information about electronic catalog content stored in an item data repository 160.

The electronic catalog content can include information about products and/or services. In one embodiment, this content is arranged in a hierarchical structure, having items associated with one or more categories or browse nodes in a hierarchy. The catalog service 130 can provide functionality for users to browse the item hierarchy in addition to searching the catalog. Users can select an item represented in the hierarchy or in a list of search results to see more details about an item. In response to a user item selection, the server 120 can provide to a user system 102 a catalog page (sometimes called an item detail page) that includes details about the selected item.

The personalization services 140 can include services for providing personalized information to users. Examples of personalization services 140 include recommendation services, personalized search services, and tag-based services. A recommendation service can use any of a variety of algorithms for generating recommendations, including behavior-based algorithms. In some embodiments, such behavior-based algorithms can analyze user behavior to generate item-to-item mappings and can use these mappings to recommend items related to a user's item selection activities. Examples of recommendation algorithms that can be used herein are described in U.S. Publication No. 2002/0198882, filed Jan. 14, 2002, titled "Content Personalization Based on Actions Performed During a Current Browsing Session," the disclosure of which is hereby incorporated by reference in its entirety. Personalized search services can recommend search queries to users, in some implementations. Tag-based services can provide functionality for users to apply textual tags to items in the catalog to thereby categorize the items. Other personalization services can include list services, where users create lists of items, blogging services, personalized social networking services, and the like.

Further, the interactive computing system 110 includes an application download service 150. The application download service 150 can include the functionality of an application store (or "app store"), making applications or content available for purchase or free download to the user systems 102. The application download service 150 can include components for browsing and/or searching a catalog of applications, which may be stored in the item data repository 160. The application download service 150 can, but need not, rely on the functionality of the catalog service 130 for this browse and/or search functionality. The application download service 150 can also combine DRM functionality with applications to enable protection from copying or modifying of applications. Further, in some embodiments, the application download service 150 can interact with the personalization services 140 to generate and/or obtain recommendations for users based on application selection or usage behavior, among possibly other recommendation criteria.

The interactive computing system 110 can also include an application upload service 190. The application upload service 190 can include components for enabling developers and their developer systems 106 to provide access to applications or content, or to upload applications or content to the interactive computing system 110. The applications or content provided using the applications upload service 190 can be stored in the item data repository 160.

When a developer provides an application to the application upload service 190, the interactive computing system 110 can use the application test system 194 to facilitate testing the application. In one embodiment, the application test system 194 can include a test selection system 196 for determining tests to perform on the application based on one or more of metadata associated with the application, metadata associated with the developer, and a trust level associated with the developer. The process of determining which tests to perform can be, and preferably is, completely automated. In some embodiments, the application test system 194 provides the application to the test suite providers 108 to perform the identified tests. Further, in some embodiments, the application test system 194 can execute one or more of the identified tests. In some embodiments, the application test system 194 may classify or rank the available tests in terms of level of importance for a given application. For example, the application test system 194 may, in connection with an application submitted by a developer, identify certain tests as "essential," while identifying other tests as "recommended" or "optional." Determining whether to perform a recommended or optional test can then be based on any predefined additional factors, such as the cost of the tests, the anticipated sales of the application, or the complexity of the test, to name a few. Further, the application test system 194 may specify that a particular test is contingent upon the outcome of another particular test (e.g., "perform test B if test A produces a result of X.")

The test suite providers 108 can include any provider of testing services for testing an application. Different test suite providers 108 may be capable of performing different tests. Further, two or more test suite providers 108 may be capable of performing the same set or subset of tests. Additionally, two or more test suite providers may test the same criteria or application behavior using different methods. Each test suite provider 108 can, but need not be, associated with a separate organization. The test suite providers 108 are depicted separately from the interactive computing system 110 and, generally, the test suite providers 108 and the interactive computing system 110 are associated with different organizations. However, in some embodiments, the test suite providers 108 and the interactive computing system 110 can be associated with the same organization. Further, in some embodiments, the test suite providers 108 can be part of the interactive computing system 110.

The interactive computing system 110 can also include a scorecard management service 192. The scorecard management service 192 can include components for creating, managing, and updating developer scorecards associated with developers who create accounts with the interactive computing system 110. Each developer who creates an account with the interactive computing system 110 can be associated with a developer scorecard. Each developer scorecard can include a developer trust level, information associated with the developer's account, and information associated with each application the developer provided the interactive computing system 110. The developer scorecard is discussed in more detail below with reference to FIG. 3 and FIG. 4.

The developer scorecards can be stored in and accessed from the developer data repository 180. Further, the developer data repository 180 can include any data associated with a developer. For example, the developer data repository 180 can store developer account data, developer metadata, and the like. The interactive computing system 110 can also include a user data repository 170 for storing any data associated with a user. For example, the user data repository can include user account data, application purchase or download data, product review data, and the like. In some embodiments, the user data can be used to determine a developer trust level associated with a developer. For example, product review data may be used as one factor in determining or modifying the developer trust level.

Example Application Upload Process

Figure 2:
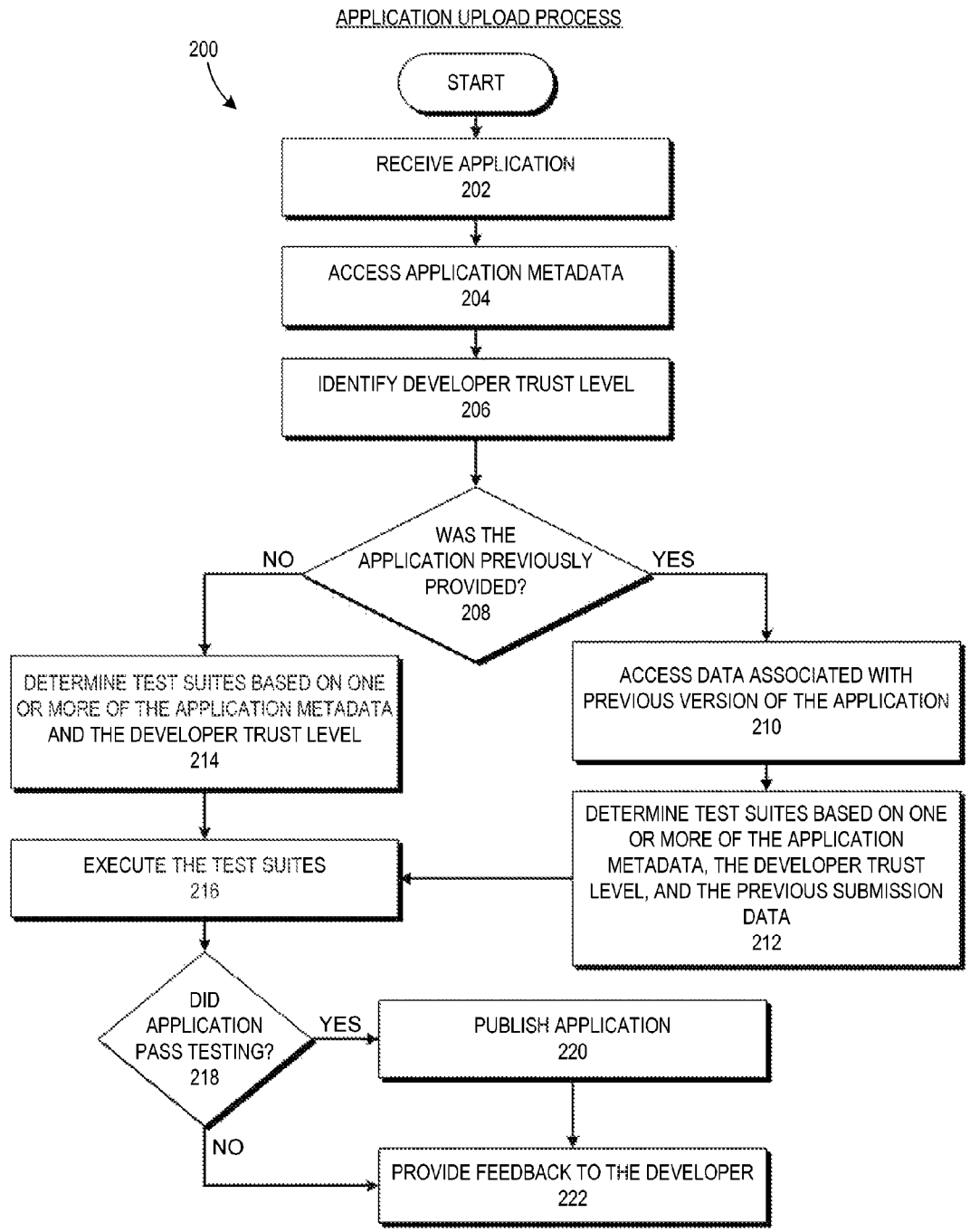
FIG. 2 illustrates a flow diagram for one embodiment of an application upload process.

FIG. 2 illustrates a flow diagram for one embodiment of an application upload process 200. The process 200 can be implemented by any system that can access and test an application. For example, the process 200, in whole or in part, can be implemented by one or more of the servers 120, the application upload service 190, the application test system 194, the test selection system 196, or the test suite providers 108, to name a few. Further, in some embodiments, the process 200 can be implemented by a distributed set of systems. In certain embodiments, the process 200 enables the selection of tests to perform on an application to be based on information specific to the application and the application's developer, which can advantageously reduce the resources expended on testing. Although any number of systems can implement the process 200 with any application, to simplify discussion, the process 200 will be described as being implemented by the application test system 194.

The process 200 begins at block 202, where an application, or portion of an application, is received, for example, by the application test system 194. In one embodiment, the application can be any type of application as described above with reference to FIG. 1. In one embodiment, the application can be provided by any user or system capable of providing the application to the application test system 194. For example, the application can be provided by the developer of the application, by a publisher associated with the application, or by an application reseller, to name a few.

At block 204, the application test system 194 accesses metadata associated with the application. This application metadata can include any type of data that can be associated with an application and/or the execution of the application. For example, the application metadata can include information identifying: the size of the application; the price of the application; the release date for the application; other providers of the application; support information for the application; the type of data accessed by the application; content rating information associated with the application; screenshots associated with the application; videos associated with the application; an icon associated with the application; a promotional image associated with the application; a demonstration version of the application; the access permissions the application requires in order to execute or to provide full application functionality; the resources accessed by the application; the computing devices that can execute the application; previous versions of the application; information or metadata associated with previous versions of the application; crash report data or statistics associated with the application, and the operating systems that can execute the application; to name a few. In one embodiment, the application's developer provides the application metadata. In one embodiment, the application is associated with a declarative design and/or security model. In this embodiment, the application metadata can be identified based on the application's declarations. In one embodiment, the application metadata is determined by analyzing one or more of: the application, the source code associated with the application, the resources accessed by the application, and the Application Programmer Interface (API) calls made by the application. The application metadata can also include a complexity associated with the application. This complexity can be determined, for example, by analyzing one or more of the application's functionality, the API calls made by the application, and the resources accessed by the application, to name a few.

At block 206, a trust level associated with the developer of the application is identified. In one embodiment, the trust level is associated with a publisher associated with the application that provided the application to the interactive computing system 110. In one embodiment, the trust level is associated with the entity that created an account with the interactive computing system 110 using, for example, the process 300 described with respect to FIG. 3 below. In one embodiment, the trust level is identified by accessing a scorecard associated with the developer. This developer scorecard can be created using the process 300 and is described in more detail with respect to FIG. 3 and FIG. 4 below. In one embodiment, the trust level is associated with the developer of the application and the application or type of application. For example, a developer may have one trust level associated with applications that access sensitive data and/or access the network, and may have a different trust level for applications that do not access any data or resources beyond those included with the application.

At decision block 208, the application test system 194 determines whether the application was previously provided to the interactive computing system 110. If so, data associated with the previous version of the application (i.e. previous submission data) is accessed at block 210. This data can include any information associated with the previous version of the application. For example, the data could include application metadata associated with the previous version of the application and information associated with the developer, the testing, the use, or the sale of the previous version of the application, to name a few. In one embodiment, the previous version of the application can include any type of application as described above with reference to FIG. 1. For example, the previous version of the application can include a version of the application with errors in the application code. As a second example, the previous version of the application can include a version of the application with fewer features. At block 212, one or more test suites based on one or more of the application metadata, the developer trust level, and the previous submission data are identified. Each test suite can include one or more tests. Further, each test suite can be associated with one or more features or processes associated with the application or the application as a whole.

If, at decision block 208, application test system 194 determines that the application was not previously submitted, one or more test suites are identified at block 214 based on the application metadata, the developer trust level, or both. At block 216, the one or more test suites are executed. In one embodiment, the application test system 194 executes the test suites. Alternatively, the interactive computing system 110 provides the application to one or more of the test suite providers 108 to execute the test suites. In one embodiment, the application test system 194 executes a subset of the test suites (or a subset of the tests associated with a test suite) and the interactive computing system 110 causes one or more of the test suite providers 108 to execute a subset of the test suites (or a subset of the tests associated with a test suite). The process of determining the system that executes the one or more test suites is described further with respect to FIG. 5 below.

In one embodiment, the application is analyzed by, for example, the application test system 194 or the test suite providers 108, to determine at least a subset of the application metadata. This application metadata can then be compared to corresponding information associated with the application that was provided by the developer to determine if the information and the at least subset of the application metadata matches. The application metadata and the developer provided information can include any type of application metadata that can be verified by the system analyzing the application. For example, the application can be analyzed to determine if the application accesses more data or different types of data than reported by the developer. As a second example, the application can be analyzed to determine if the application uses API calls that were not reported by the developer. If it is determined that the at least subset of application metadata does not match the developer provided information, different or additional test suites can be selected at block 212 or block 214 to perform on the application. In one embodiment, the mismatch in the analyzed application metadata and the information provided by the developer can be a scorecard adjustment event that affects the developer trust level associated with the developer's scorecard. The scorecard adjustment event and developer's scorecard are described further with respect to FIG. 4 below.

At decision block 218, the application test system 194 determines whether the application passed testing. If so, the interactive computing system 110 can publish the application at block 220. Publishing the application can include, for example, making the application available for download by the user systems 102; listing the application with the catalog service 130; and providing the application download service 150 with access to the application, to name a few. At block 222, feedback is provided to the developer. This feedback can include any information associated with one or more of testing of the application and publishing of the application. For example, the feedback can include: identifying that the application passed testing; reporting the tests performed; reporting the tests that passed; and reporting that the application is published or is to be published, to name a few. In one embodiment, block 220 can be optional. For example, process 200 can be used as part of a distributed testing service. In this example, the application may or may not be published regardless of whether the application passes testing. In one embodiment, block 222 can be optional.

If the application did not pass testing, feedback is provided to the developer at block 222. This feedback can include any information associated with one or more of testing of the application and publishing of the application. For example, the feedback can include: identifying that the application failed testing; reporting the tests performed; reporting the tests that failed; reporting the tests that passed, if any; reporting that the application will not be published; and providing suggestions to facilitate passing the tests if the developer chooses to resubmit the application; to name a few. In one embodiment, block 222 is optional.

In one embodiment, the developer identifies one or more computing devices or operating systems that the developer asserts are capable of executing the application. Alternatively, the application test system 194 analyzes the application to determine the one or more computing devices or operating systems likely capable of executing the application successfully. The one or more computing devices can refer to one or more types or models of computing devices. Similarly, the one or more operating systems can refer to one or more types or versions of operating systems. In certain embodiments, process 200, in whole or in part, can be performed separately for the one or more computing devices or operating systems identified by the developer or the application test system 194.

As an example of performing the process 200 separately for multiple devices or operating systems, suppose that an application developer specifies that the application is designed or intended to execute on all Brand X, Model Y devices that are running operating system Z versions 1-3. Using the process 200, the application can be tested separately for Brand X, Model Y devices running operating system Z version 1; Brand X, Model Y devices running operating system Z version 2; and Brand X, Model Y devices running operating system Z version 3. Alternatively, the application is not tested separately, but the determination at decision block 218 of whether the application passed testing is made separately for each identified type of computing device or operating system. Thus, it is possible, for example, that the application may pass all test suites associated with running the application on Brand X, Model Y devices running operating system Z version 1 and 2, but not Brand X, Model Y devices running operating system Z version 3. Advantageously, in some embodiments, by separately testing or by separately determining if each type of computing device passed testing, it is possible to publish the application for some types of identified computing devices or operating systems even if the application did not pass testing for all identified types of computing devices or operating systems.

Example Developer Account Creation Process

Figure 3:
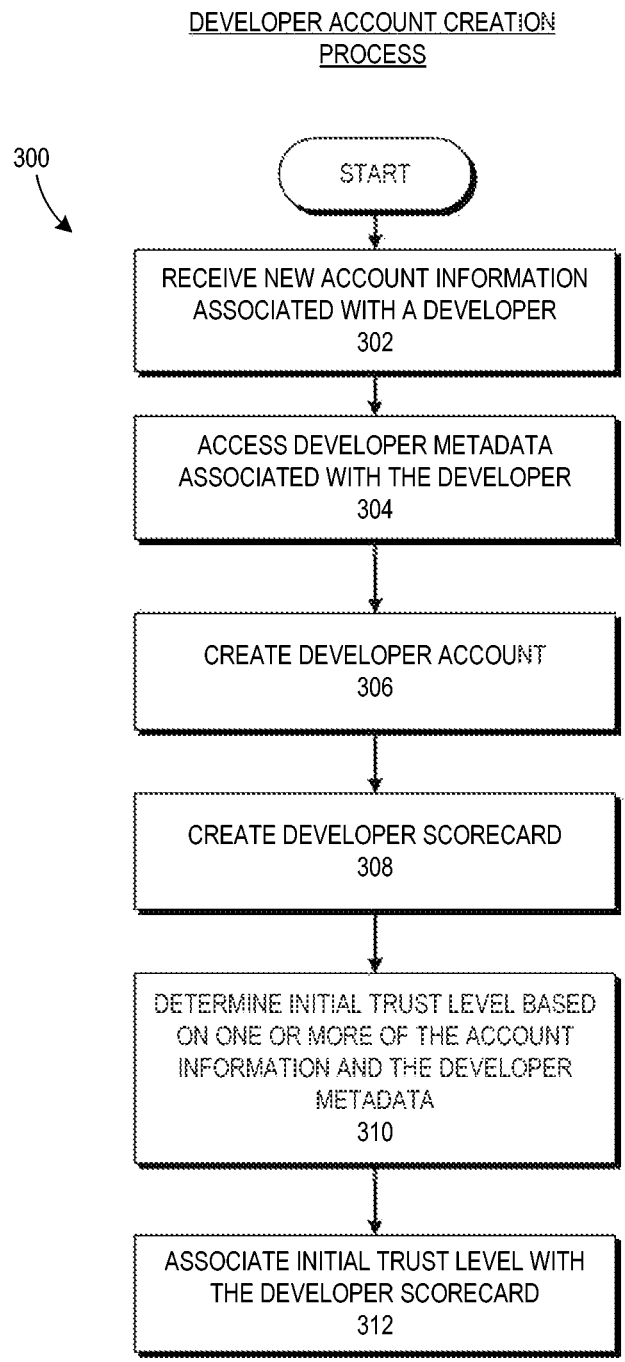
FIG. 3 illustrates a flow diagram for one embodiment of a developer account creation process.

FIG. 3 illustrates a flow diagram for one embodiment of a developer account creation process 300. The process 300 can be implemented by any system that can facilitate a developer creating an account with the interactive computing system 110. For example, the process 300 can be implemented, in whole or in part, by one or more of servers 120, the application test system 194, the scorecard management service 192, and the application upload service 190, to name a few. To simplify discussion, the process 300 will be described as being performed by the interactive computing system 110 generally. The account, at least, enables the provisioning of an application to the interactive computing system 110 for one or more of: testing the application, publishing the application, selling the application, and providing the application to users associated with the user systems 102. In one embodiment, any user can create a developer account. For example, the account can be created by a publisher of an application or a sales manager associated with an application's publisher, to name a couple.

The process 300 begins at block 302 with, for example, the interactive computing system 110 receiving new account information associated with a developer. This account information can include any information generally associated with creating an account with a service provider. For example, the account information can include: a user name, a password, a phone number, a home address, a business address, an email address, an acceptance of terms of service indicator, payment information, billing information, and a unique identification number (e.g. a social security number or tax identification number), to name a few. In one embodiment, the account information is associated with an application publisher or other application provider.

At block 304, the interactive computing system 110 accesses developer metadata associated with the developer. This developer metadata can include any information associated with the account creator that may or may not be provided as part of the account information. For example, the developer metadata can include: a geographic location of the developer (e.g. the country within which the developer is based); a size of an organization associated with the developer (e.g. the number of employees or the number of office locations of a business associated with the developer); the revenue of the organization or developer; ratings associated with the organization (e.g. customer satisfaction ratings, peer rankings, or third-party industry ratings); ratings associated with products provided by the developer to other interactive computing systems; the frequency with which bugs or programming errors are discovered in applications created by the developer, the average number of submissions by the developer of an application before the application passes testing; and information associated with other accounts the developer may have created on interactive computing system 110; to name a few. This developer metadata can be provided by the developer or other account creator, obtained from one or more third-party sources, such as a government organization or industry trade publication, or determined by the interactive computing system 110, for example, by mining the provided account information or by accessing from a network, such as the Internet, information associated with the developer.

At block 306, the interactive computing system 110 creates a developer account associated with the developer. Using this account, the developer can submit applications for testing and publication. In one embodiment, a developer can create multiple accounts. Alternatively, the developer is limited to one account. Limiting the developer to one account can be enforced by associating the account with a unique identifier, such as a tax identification number.

At block 308, the interactive computing system 110 creates a developer scorecard associated with the developer. At block 310, the interactive computing system 110 determines an initial trust level based on one or more of the account information and the developer metadata. In one embodiment, determining the initial trust level can comprise verifying one or more of the account information and the developer metadata. In one embodiment, when the developer account is first created, or if there is not enough information to determine a developer trust level, the developer scorecard is associated with a default trust level. At block 312, the initial trust level is associated with the developer scorecard.

In one embodiment, the developer scorecard can include any type of information or metric associated with one or more of the developer and the developer account. For example, the developer scorecard can include: customer reviews associated with the developer or one or more applications submitted by the developer; average customer review scores; the number of downloads of the developer's applications; the number of updates or patches submitted by the developer for the developer's applications; sales of the developer's applications; the number of times the developer's applications have crashed; and the average number of times the developer's applications have crashed per user or per device; to name a few. In one embodiment, the scorecard is associated with the developer. Thus, if a developer creates multiple accounts, one scorecard can be associated with the developer across each of the developer's accounts.

Example Scorecard Update Process

Figure 4:
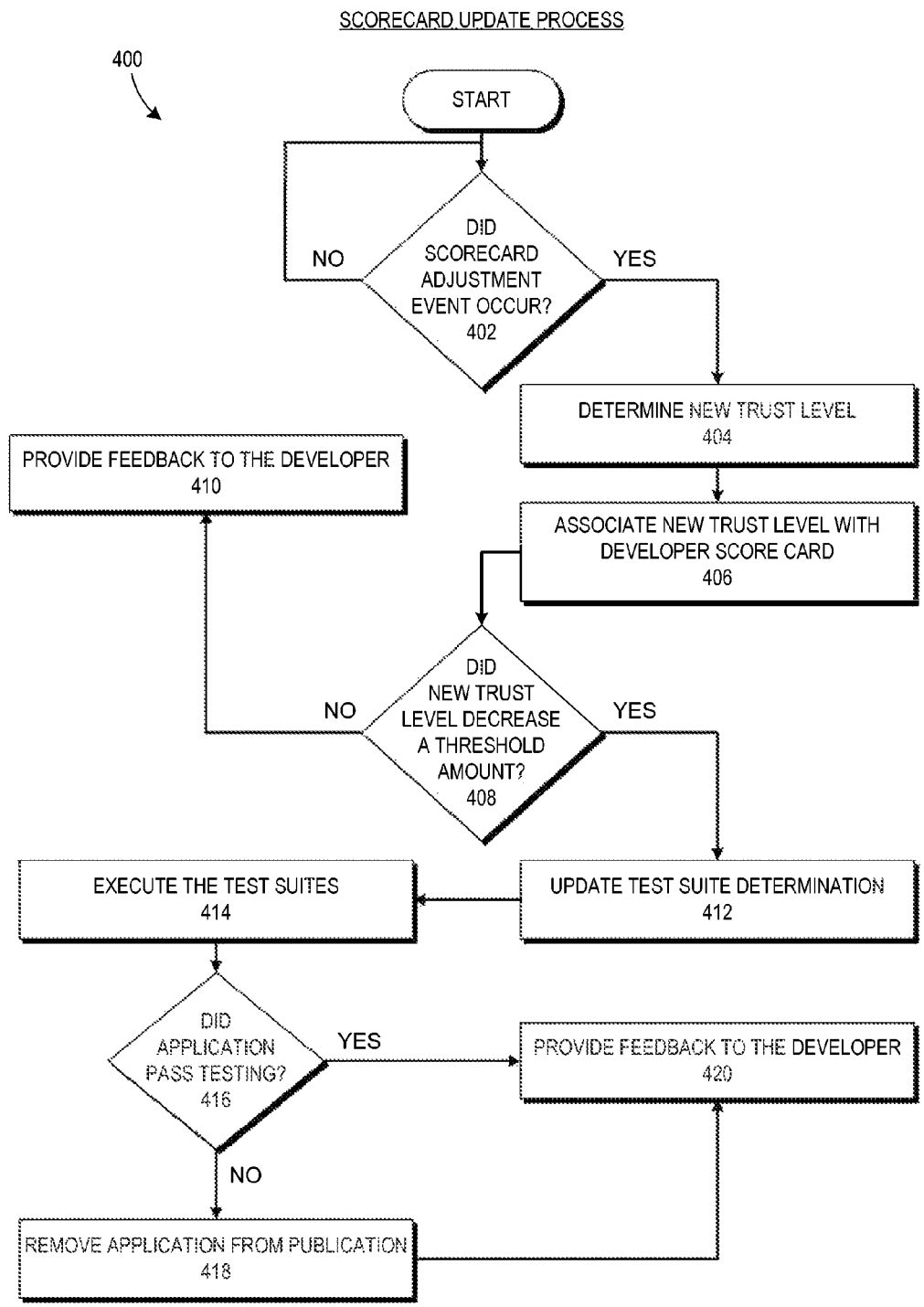
FIG. 4 illustrates a flow diagram for one embodiment of a scorecard update process.

FIG. 4 illustrates a flow diagram for one embodiment of a scorecard update process 400. The process 400 can be implemented by any system that can update a developer scorecard. For example, the process 400 can be implemented, in whole or in part, by one or more of servers 120, the application test system 194, the scorecard management service 192, the test selection system 196, and the application upload service 190, to name a few. To simplify discussion, the process 400 will be described as being performed by the interactive computing system 110 generally. Further, to simplify discussion, the process 400 will be described in relation to a single developer scorecard. However, the process 400 is not limited as such. The process 400 can be performed in relation to any number of developer scorecards. Further, the process 400 can be implemented per developer scorecard, per predefined group or subgroup of developer scorecards, substantially in parallel for all developer scorecards, or for each scorecard associated with a scorecard adjustment event.

The process 400 begins at decision block 402 when, for example, the interactive computing system 110 determines whether a scorecard adjustment event occurred. A scorecard adjustment event can include any trust-changing event or predefined event identified as potentially affecting the trust level associated with a developer. For example, a scorecard adjustment event can include: the passage of time; the submission of a new application; the submission of an update or patch for an application; the identification of a new bug or programming error; a change in the average number of submissions of an application from the developer before the application passes testing; a change in the frequency with which bugs or programming errors are identified in applications submitted by the developer; receipt of one or more customer complaints associated with an application; receipt of customer ratings associated with an application; a change in average customer ratings associated with an application; receipt of updated developer metadata, such as from a competing application publishing system that also publishes applications associated with the developer; and receipt of increased crash reports associated with an application; to name a few.

Further, a scorecard adjustment event can be a binary event (i.e. the event occurred or did not occur), a combination of predefined events, or a threshold event, to name a few. For example, a scorecard adjustment event can include the combination of receiving five customer complaints associated with an application and the submission of a patch for the application. As a second example, the scorecard adjustment event can include a change in average customer ratings by at least two stars, assuming a five star scale. A scorecard adjustment event can be a positive or negative event. Thus, for example, an increase or a decrease in the average customer ratings can be a scorecard adjustment event. In one embodiment, the predefined scorecard adjustment events may differ for different developer accounts and/or developer scorecards. In one embodiment, a scorecard adjustment event can be associated with one or more developer scorecards. The process 400 can be implemented for each developer scorecard associated with the scorecard adjustment event.

If a scorecard adjustment event occurred, the interactive computing system 110 determines a new trust level for the developer associated with the developer scorecard at block 404. The new trust level can be based on one or more of the developer's account information, the developer's developer metadata, and the scorecard adjustment event. This new trust level is associated with the developer scorecard at block 406. At decision block 408, the interactive computing system 110 determines if the new trust level decreased a threshold amount. In one embodiment, the interactive computing system 110 determines if the new trust level decreased below a threshold. In one embodiment, the interactive computing system 110 determines if the new trust level decreased a threshold amount and decreased below a threshold. Advantageously, in some embodiments, a small change in trust level that nevertheless results in the trust level decreasing below a threshold can be treated differently from a large change in trust level that results in the trust level decreasing below the threshold. The small change in trust level and the large change in trust level can be predefined by, for example, an administrator associated with the interactive computing system 110.

If the new trust level did not decrease a threshold amount, feedback is provided to the developer associated with the developer scorecard at block 410. Alternatively, if the new trust level increases a threshold amount, feedback is provided to the developer associated with the developer scorecard at block 410. This feedback can include any information related to the change in trust level. For example, the feedback can include: alerting the developer to the change in trust level; informing the developer of the one or more scorecard adjustment events associated with the change in trust level; and providing suggestions on maintaining or increasing the developer trust level; to name a few. Further, providing the feedback to the developer can include any method for providing feedback. For example, providing the feedback can include: emailing the developer, posting the feedback to a public webpage, post the feedback to a private webpage, or sending a text message or Short Message Service (SMS) message to the developer, to name a few. In one embodiment, block 410 is optional.

If the new trust level decreased a threshold amount, the interactive computing system 110 updates a test suite determination at block 412. This updated test suite determination can be for the application associated with the scorecard adjustment event, for a group or subgroup of applications associated with the developer who is associated with the developer scorecard, or for all applications associated with the developer who is associated with the developer scorecard. The group or subgroup of applications can be defined based on any criteria. For example, the group of applications can be all versions (e.g. a trial version and a full version, or an ANDROID operating system version and an iOS operating system version) of the application associated with the scorecard adjustment event. As a second example, the group of applications can be all applications classified similarly as the application associated with the scorecard adjustment event, such as all banking applications or all gaming applications from the same developer. Further, the change in trust level can affect the test suite determination associated with process 200 for newly submitted applications. The updated test suite determination can be based on one or more of: the application metadata; the developer trust level; the previous submission data, if any; the scorecard adjustment event; the trust level decrease amount; and the threshold that triggered the updated test suite determination; to name a few.

At block 414, the one or more test suites associated with the updated test suite determination are executed. As with the updated test suite determination, the one or more test suites can be executed on the application associated with the scorecard adjustment event, for a group or subgroup of applications associated with the developer who is associated with the developer scorecard, or for all applications associated with the developer who is associated with the developer scorecard. In one embodiment, in the case where multiple applications are tested at block 414, each application may be tested using the same updated test suite determination or a different updated test suite determination.

At decision block 416, the interactive computing system 110 determines if the one or more applications passed testing. If so, feedback is provided to the developer at block 420. This feedback be provided in the same manner and can include the same type of feedback as described above with relation to block 410 and block 222. Further, the feedback can include one or more of: identification of the additional test suites, why additional tests were performed, identification of the tests that passed, and identification of tests that failed, to name a few. In one embodiment, block 420 is optional.

If the application did not pass testing, the application associated with the scorecard adjustment event is removed from publication at block 418 and feedback is provided to the developer at block 420. In one embodiment, removing the application from publication can include removing additional applications associated with the developer score card. In one embodiment, as with the process 200, the additional testing can be performed separately for different versions of the application or for different computing devices or operating systems previously identified as compatible with the application. Thus, removing the application from publication can include removing the application from the listing of computing devices or operating systems previously identified as compatible with the application that failed the updated testing while maintaining the listing for computing devices or operating systems that passed the testing. In one embodiment, removing the application from publication can include one or more of notifying users associated with the user systems 102 who have obtained a copy of the application that the application is being removed from publication, notifying the users of why the application is being removed from publication, deactivating the copy of the application, and removing the copy of the application from the user system 102.

In one embodiment, blocks 412, 414, and 416 are optional. If it is determined that the trust level decreased a threshold amount at decision block 408, the application is removed from publication at block 418 without any further testing.

In one embodiment, multiple threshold levels can be predefined. In one embodiment, different processes can be associated with different threshold levels. For example, if the trust level decreases past a first threshold level, additional application testing can be performed. Continuing this example, if the trust level decreases past a second threshold level, the application can be removed from publication regardless of any further testing or the results of any further testing.

Example Test Suite Provider Selection Process

Figure 5:
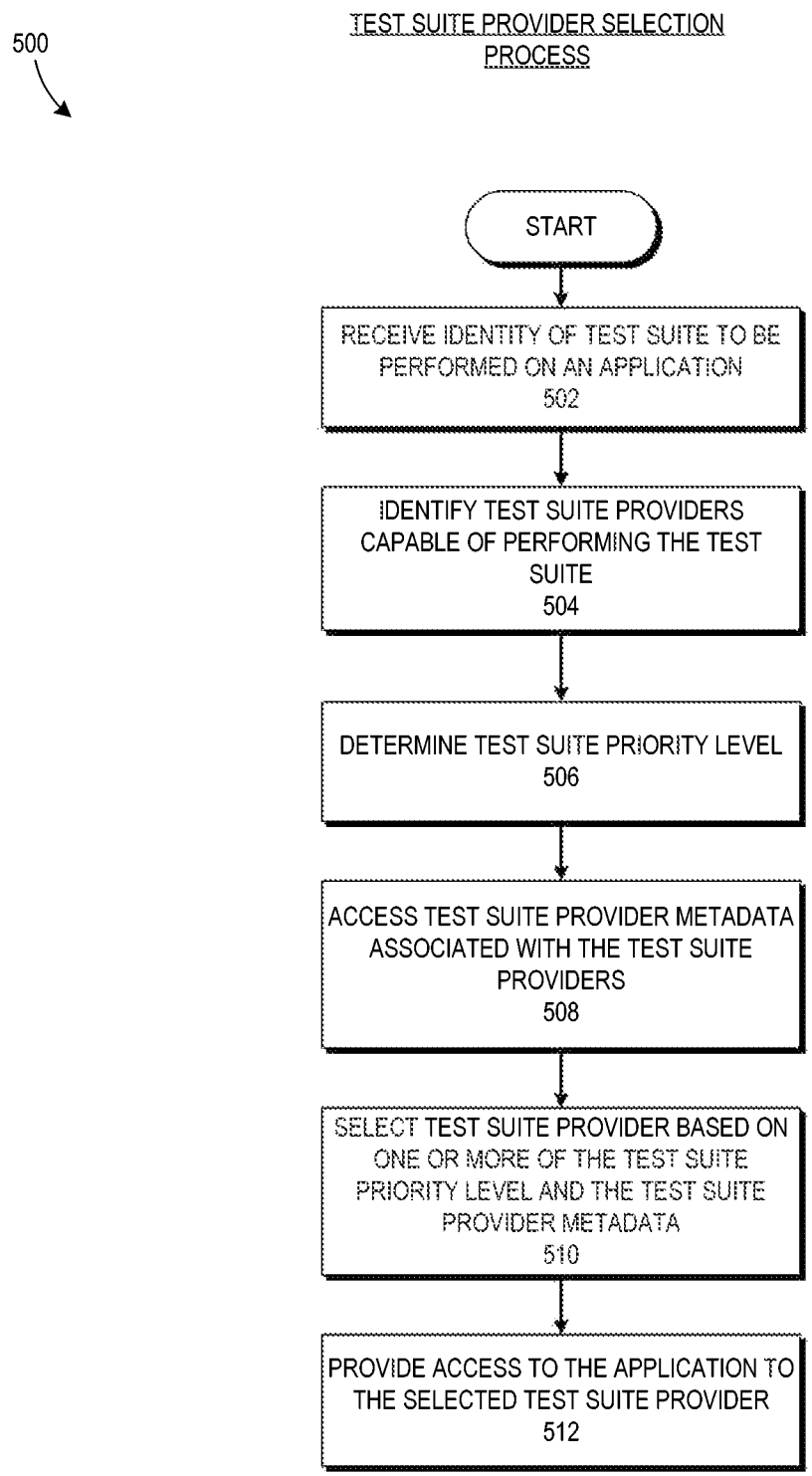
FIG. 5 illustrates a flow diagram for one embodiment of a test suite provider selection process.

FIG. 5 illustrates a flow diagram for one embodiment of a test suite provider selection process 500. The process 500 can be implemented by any system that can select one or more test suite providers 108 to execute tests on an application. For example, the process 500 can be implemented, in whole or in part, by one or more of the servers 120, the application test system 194, the scorecard management service 192, the test selection system 196, and the application upload service 190, to name a few. To simplify discussion, the process 500 will be described as being performed by the interactive computing system 110 generally.

The process 500 begins at block 502 when, for example, the interactive computing system 110 receives the identity of a test suite to be performed on an application. In one embodiment, the process 500 begins when the interactive computing system 110 determines a test suite to be performed on an application. Each test suite can include one or more tests. Further, in some embodiments, the identity of multiple test suites are received. In one embodiment, receiving the identity of the test suite includes receiving test requirements. These test requirements can include any criteria associated with testing the application. For example, the test requirements can include: the cost associated with the testing; the time associated with the testing; and the reliability of the testing; to name a few.

At block 504, the interactive computing system 110 identifies the test suite providers 108 capable of performing the test suite. In one embodiment, block 504 also includes identifying if a testing system associated with the interactive computing system 110, such as the application test system 194, is capable of performing the test suite.

At block 506, the interactive computing system 110 determines the test suite priority level. The test suite priority level can be based on any criteria for identifying the importance of a test. Further, the test suite priority level can be associated with a minimum test accuracy threshold and/or a maximum time threshold for obtaining the test results. For example, the test suite priority level can be based on one or more of the application being tested, the anticipated revenue from sales of the application, the anticipated number of customers or users who may be interested in the application, the feature or element of the application the test suite is designed to test, and the type of data that the application is potentially capable of accessing, to name a few. In one embodiment, the test suite priority level can be based on the developer trust level associated with the developer who submitted the application.

At block 508, the interactive computing system 110 accesses test suite provider metadata associated with the test suite providers 108 capable of performing the test suite. This test suite provider metadata can include any data associated with the test suite providers 108. For example, the test suite provider metadata can include: the price charged by the test suite provider, the accuracy rating associated with the test suite provider, whether the test suite provider is meeting its Service Level Agreement (SLA), the amount of work the test suite provider can perform in a given time period, the amount of work that has already been provided to the test suite provider in a given time period, the location of the test suite provider, any fees owed to the test suite provider, and any existing credit with the test suite provider, to name a few.

At block 510, the interactive computing system 110 selects a test suite provider 108 based on the test suite priority level, the test suite provider metadata, or both. In one embodiment, the test suite provider 108 can be selected, at least in part, based on the test requirements. The interactive computing system 110 provides the selected test suite provider 108 with access to the application at block 512. In one embodiment, providing access to the application can also include providing the identity of the test suite to be performed. Alternatively, the test suite provider 108 bases the test suite selection on the SLA. In one embodiment, the application test system 194 is selected to perform the test suite or a subset of the tests associated with the test suite.

A number of computing systems have been described throughout this disclosure. The definitions of these systems are not intended to limit the teachings or applicability of this disclosure. For example, the user systems 102 and the developer systems 106 can generally include any computing device(s), such as desktops, laptops, wireless mobile devices (such as smart phones, PDAs, tablets, or the like), video game platforms, television set-top boxes, televisions (e.g., internet TVs), and computerized appliances, to name a few. Further, it is possible for the user systems 102 and the developer systems 106 to be different types of devices, to include different applications, or to otherwise be configured differently. In addition, the user systems 102 and developer systems 106 can include any type of operating system ("OS"). For example, the user systems 102 and developer systems 106 can implement an Android™ OS, a Windows® OS, a Mac® OS, a LINUX or UNIX-based OS, or the like. Moreover, it is possible for a user system 102 to also be a developer system 106, and vice versa.

Further, the processing of the various components of the interactive computing system 110 can be distributed across multiple machines, networks, and other computing resources. In addition, two or more of the components of the interactive computing system 110 can be combined into fewer components. The various components of the interactive computing system 110 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The interactive computing system 110 may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 2, may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of selecting one or more tests to perform on an application, the method comprising:
    by an application test system implemented in a computing system comprising one or more processors:
        receiving an application submitted by a developer;
        accessing developer metadata associated with the developer, the developer metadata comprising information associated with a probability that the developer will produce applications satisfying a set of performance criteria associated with execution of the application;
        determining a trust level associated with the developer based, at least in part, on the developer metadata;
        identifying a set of device configurations for devices identified as supporting execution of the application;
        determining at least one test to perform on the application based, at least in part, on the trust level, the at least one test associated with determining operation characteristics of the application;
        causing a version of the at least one test to be executed for each of the set of device configurations;
        determining a new trust level associated with the developer based, at least in part, on a trust changing event;
        determining whether the new trust level differs by at least a threshold amount from the trust level; and
        in response to determining that the new trust level differs by at least the threshold amount, updating the determination of the at least one test to perform on the application.

2. The method of claim 1, wherein basing the trust level, at least in part, on the developer metadata further comprises verifying the developer metadata.

3. The method of claim 1, wherein determining the at least one test further comprises accessing application metadata associated with the application and determining the at least one test based, at least in part, on the application metadata.

4. The method of claim 3, wherein determining the at least one test based, at least in part, on the application metadata further comprises verifying the application metadata.

5. The method of claim 1, further comprising:
    accessing a test result associated with the at least one test;
    determining at least one additional test to perform on the application based, at least in part, on the test result; and
    executing the at least one additional test on the application.

6. The method of claim 1, wherein the application comprises one or more of the following: a new application; a new version of the application; an update associated with the application; a patch associated with the application; an extension associated with the application; a module associated with the application; a beta version of the application; or a new release candidate associated with the application.

7. The method of claim 1, further comprising:
    determining if the new trust level satisfies a threshold; and
    in response to determining that the new trust level satisfies a threshold:
        determining at least one new test to perform on the application based, at least in part, on the new trust level; and
        executing the new test on the application.

8. The method of claim 1, wherein the developer metadata comprises data associated with multiple sources of data.

9. The method of claim 1, further comprising accessing at least some of the developer metadata from Internet based sources.

10. The method of claim 1, wherein the information comprises one or more of the following: geographic location of the developer; size of an entity associated with the developer; revenue of the entity; ratings of the entity; ratings of other applications created by the developer; frequency of errors discovered in the other applications; and application test protocols implemented by the developer.

11. The method of claim 1, wherein the information relates to one or more prior applications developed by the developer.

12. The method of claim 1, wherein the set of performance criteria comprises at least one of the following: functionality of the application on a particular device model; functionality of the application on a particular operating system; impact on battery-life; impact on network utilization; and functionality of the application as specified by the developer.

13. The method of claim 1, wherein the at least one test comprises at least one of the following: a test to determine whether the application performs one or more functions identified by the developer; a test to determine whether the application performs one or more functions not identified by the developer; a battery-impact test; a network resource utilization test; a test to determine whether the application executes within specification on a particular device model; and a test to determine whether the application executes within specification on a particular operating system.

14. The method of claim 1, wherein the set of device configurations comprises a plurality of device configurations and the causing the version of the at least one test to be executed comprises causing a different version of the at least one test to be executed for at least some of the plurality of device configurations.

15. The method of claim 1, further comprising accessing previous submission data associated with the processing of an alternative version of the application received before receipt of the application by the application test system, the previous submission data comprising at least one of test data for the alternative version of the application or access data for the alternative version of the application, wherein the determining the at least one test to perform on the application is based at least in part on the trust level and the previous submission data.

16. A system for selecting one or more tests to perform on an application, the system comprising:
 an application test system comprising computer hardware, the application test system configured to:
  receive an application submitted by a developer system over a network;
  access developer metadata associated with the developer, the developer metadata comprising information associated with a probability that the developer will produce applications satisfying a set of criteria associated with execution of the application;
  determine a trust level associated with a developer associated with the application, wherein the trust level is based, at least in part, on the developer metadata;
  identify a set of device configurations for devices identified as supporting execution of the application;
  determine at least one test to perform on the application based, at least in part, on the trust level, the at least one test associated with determining operation characteristics of the application;
  cause a version of the at least one test to be executed for each of the set of device configurations;
  determine a new trust level associated with the developer based at least in part, on a trust changing event;
  determine whether the new trust level differs by at least a threshold amount from the trust level; and
  in response to determining that the new trust level differs by at least the threshold amount, update the determination of the at least one test to perform on the application.

17. The system of claim 16, wherein the application test system is further configured to verify the developer metadata.

18. The system of claim 16, wherein the application test system is further configured to access application metadata associated with the application and to determine the at least one test based, at least in part, on the application metadata.

19. The system of claim 18, wherein the application test system is further configured to verify the application metadata.

20. The system of claim 16, wherein the application test system is further configured to:
 access a test result associated with the at least one test;
 determine at least one additional test to perform on the application based, at least in part, on the test result; and
 execute the at least one additional test on the application.

21. The system of claim 16, wherein the application comprises one or more of the following: a new application; a new version of the application; an update associated with the application; a patch associated with the application; an extension associated with the application; a module associated with the application; a beta version of the application; or a new release candidate associated with the application.

22. The system of claim 16, wherein the application test system is further configured to:
 determine if the new trust level satisfies a threshold; and
 in response to determining that the new trust level satisfies a threshold, the application test system is further configured to:
  determine at least one new test to perform on the application based, at least in part, on the new trust level; and
  execute the new test on the application.

23. The system of claim 16, wherein the developer metadata comprises data associated with multiple sources of data.

24. The system of claim 16, wherein the application test system is further configured to access at least some of the developer metadata from Internet based sources.

25. The system of claim 16, wherein the set of device configurations comprises a plurality of device configurations and the application test system is further configured to cause the version of the at least one test to be executed by causing a different version of the at least one test to be executed for at least some of the plurality of device configurations.

26. A computer-readable non-transitory storage medium comprising computer-executable instructions configured to implement a method of selecting one or more tests to perform on an application, the method comprising:
 receiving an application submitted by a developer;
 accessing developer metadata associated with the developer, the developer metadata comprising information associated with a probability that the developer will produce applications satisfying a set of criteria associated with execution of the application;
 determining a trust level associated with the developer based, at least in part, on the developer metadata;
 identifying a set of device configurations for devices identified as supporting execution of the application;
 determining at least one test to perform on the application based, at least in part, on the trust level, the at least one test associated with determining operation characteristics of the application;
 causing a version of the at least one test to be executed for each of the set of device configurations;
 determining a new trust level associated with the developer based, at least in part, on a trust changing event;
 determining whether the new trust level differs by at least a threshold amount from the trust level; and
 in response to determining that the new trust level differs by at least the threshold amount, updating the determination of the at least one test to perform on the application.

27. The computer-readable non-transitory storage medium of claim 26, wherein basing the trust level, at least in part, on the developer metadata further comprises verifying the developer metadata.

28. The computer-readable non-transitory storage medium of claim 26, wherein determining the at least one test further comprises accessing application metadata associated with the application and determining the at least one test based, at least in part, on the application metadata.

29. The computer-readable non-transitory storage medium of claim 28, wherein determining the at least one test based, at least in part, on the application metadata further comprises verifying the application metadata.

30. The computer-readable non-transitory storage medium of claim 26, wherein the method further comprises:
   accessing a test result associated with the at least one test;
   determining at least one additional test to perform on the application based, at least in part, on the test result; and
   executing the at least one additional test on the application.

31. The computer-readable non-transitory storage medium of claim 26, wherein the application comprises one or more of the following: a new application; a new version of the application; an update associated with the application; a patch associated with the application; an extension associated with the application; a module associated with the application; a beta version of the application; or a new release candidate associated with the application.

32. The computer-readable non-transitory storage medium of claim 26, wherein the method further comprises:
   determining if the new trust level satisfies a threshold; and
   in response to determining that the new trust level satisfies a threshold:
      determining at least one new test to perform on the application based, at least in part, on the new trust level; and
      executing the new test on the application.

33. The computer-readable non-transitory storage medium of claim 26, wherein the developer metadata comprises data associated with multiple sources of data.

34. The computer-readable non-transitory storage medium of claim 26, wherein the method further comprises accessing at least some of the developer metadata from Internet based sources.

35. The computer-readable non-transitory storage medium of claim 26, wherein the set of device configurations comprises a plurality of device configurations and the causing the version of the at least one test to be executed comprises causing a different version of the at least one test to be executed for at least some of the plurality of device configurations.

* * * * *